US011124587B2

(12) United States Patent
Miyagawa et al.

(10) Patent No.: US 11,124,587 B2
(45) Date of Patent: Sep. 21, 2021

(54) ACRYLIC RESIN POWDER AND RESIN COMPOSITION FOR HOT MELT ADHESIVES, AND METHOD OF PRODUCING SAME

(71) Applicant: Mitsubishi Chemical Corporation, Chiyoda-ku (JP)

(72) Inventors: Akiko Miyagawa, Chiyoda-ku (JP); Tooru Kondou, Chiyoda-ku (JP); Eriko Satou, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 195 days.

(21) Appl. No.: 16/317,991

(22) PCT Filed: Jun. 22, 2017

(86) PCT No.: PCT/JP2017/022951
§ 371 (c)(1),
(2) Date: Jan. 15, 2019

(87) PCT Pub. No.: WO2018/012234
PCT Pub. Date: Jan. 18, 2018

(65) Prior Publication Data
US 2019/0233562 A1    Aug. 1, 2019

(30) Foreign Application Priority Data
Jul. 15, 2016   (JP) .............................. JP2016-139954

(51) Int. Cl.
| | |
|---|---|
| *C08F 220/14* | (2006.01) |
| *C08L 33/12* | (2006.01) |
| *C08G 18/76* | (2006.01) |
| *C08G 18/10* | (2006.01) |
| *C08G 18/42* | (2006.01) |
| *C08L 71/02* | (2006.01) |
| *C08F 265/06* | (2006.01) |
| *C09J 171/02* | (2006.01) |
| *C08G 18/48* | (2006.01) |
| *C08G 18/20* | (2006.01) |
| *C09J 133/10* | (2006.01) |
| *C09J 175/08* | (2006.01) |
| *C08G 18/62* | (2006.01) |
| *C08J 3/14* | (2006.01) |
| *C09J 11/08* | (2006.01) |
| *C09J 133/12* | (2006.01) |
| *C09J 175/14* | (2006.01) |

(52) U.S. Cl.
CPC .......... *C08F 220/14* (2013.01); *C08F 265/06* (2013.01); *C08G 18/10* (2013.01); *C08G 18/2081* (2013.01); *C08G 18/4238* (2013.01); *C08G 18/48* (2013.01); *C08G 18/4808* (2013.01); *C08G 18/4825* (2013.01); *C08G 18/6225* (2013.01); *C08G 18/7671* (2013.01); *C08J 3/14* (2013.01); *C08L 33/12* (2013.01); *C08L 71/02* (2013.01); *C09J 11/08* (2013.01); *C09J 133/10* (2013.01); *C09J 133/12* (2013.01); *C09J 171/02* (2013.01); *C09J 175/08* (2013.01); *C09J 175/14* (2013.01); *C08G 2170/20* (2013.01); *C08J 2333/12* (2013.01)

(58) Field of Classification Search
CPC ...................................................... C08F 22/14
See application file for complete search history.

(56) References Cited

U.S. PATENT DOCUMENTS

| | | | |
|---|---|---|---|
| 5,314,965 A | 5/1994 | Kishida et al. | |
| 5,371,149 A | 12/1994 | Kishida et al. | |
| 2004/0072925 A1 | 4/2004 | Saiki et al. | |
| 2010/0258245 A1 | 10/2010 | Akeda et al. | |
| 2013/0085202 A1 | 4/2013 | Nakanishi et al. | |
| 2014/0024781 A1 | 1/2014 | Tamogami et al. | |

FOREIGN PATENT DOCUMENTS

| | | |
|---|---|---|
| CN | 104011098 A | 8/2014 |
| EP | 2 796 482 A1 | 10/2014 |
| JP | 2-120306 A | 5/1990 |
| JP | 2003-183331 A | 7/2003 |
| JP | 2008-280441 A | 11/2008 |
| JP | 2009-74087 A | 4/2009 |

(Continued)

OTHER PUBLICATIONS

The partial Supplementary European Search Report dated Jun. 26, 2019 in Patent Application 17827364.5, 10 pages.
International Search Report dated Sep. 26, 2017 in PCT/JP2017/022951 filed on Jun. 22, 2017.
Japanese Office Action dispatched on Aug. 13, 2018 in Japanese Patent Application No. 2017-538743, with translation.

(Continued)

*Primary Examiner* — Mark S Kaucher
(74) *Attorney, Agent, or Firm* — Oblon, McClelland, Maier & Neustadt, L.L.P.

(57) ABSTRACT

An object of the present invention is to provide an acrylic resin powder suitable for hot melt adhesives which dissolves in polyol components such as polyalkylene glycols faster than conventional ones, as well as a resin composition which can be produced with lower energy than conventional ones. The object is achieved by using an acrylic resin powder comprising: a copolymer which contains a methyl methacrylate unit, wherein a volume average particle size of a primary particle is 0.1 to 10 µm, a volume average particle size of a secondary particle is 20 to 80 µm, a weight average molecular weight is 10,000 to 500,000, and the acrylic resin powder is soluble in polypropylene glycol having a weight average molecular weight of 1000 under stirring at a concentration of 10% by mass at 60° C. for 60 minutes.

15 Claims, No Drawings

(56) References Cited

FOREIGN PATENT DOCUMENTS

| | | |
|---|---|---|
| JP | 2010-248278 A | 11/2010 |
| JP | 2012-46613 A | 3/2012 |
| JP | 2013-79304 A | 5/2013 |
| WO | WO 03/004568 A1 | 1/2003 |

OTHER PUBLICATIONS

Combined Chinese Office Action and Search Report dated Jun. 2, 2020, in Patent Application No. 201780043955.7 (with English translation), 17 pages.

ACRYLIC RESIN POWDER AND RESIN COMPOSITION FOR HOT MELT ADHESIVES, AND METHOD OF PRODUCING SAME

CROSS REFERENCE TO RELATED APPLICATIONS

This application is a 371 of International Patent Application No. PCT/JP2017/022951, filed on Jun. 22, 2017, and claims priority to Japanese Patent Application No. 2016-139954, filed on Jul. 15, 2016, both of which are incorporated herein by reference in their entireties.

TECHNICAL FIELD

The present invention relates to an acrylic resin powder and a resin composition for hot melt adhesives, and a method of producing the same.

BACKGROUND ART

A hot melt adhesive is an adhesive which is a solid or semi-solid at room temperature and is melted by heating to become to have fluidity. Hot melt adhesives which main component is a urethane prepolymer having an isocyanate group at the end are particularly called reactive hot melt adhesives. Many of them are moisture-curable urethane adhesives, which are usually in the form of isocyanate group-containing urethane prepolymer obtained by condensation polymerization of polyol components and isocyanate components.

These reactive hot melt adhesives are applied to a substrate in a heated and molten state, and cooled and solidified. Thereafter, moisture curing takes place due to the chemical crosslinking reaction between the isocyanate groups and water to form a strong film (adhesive layer) having thermal resistance and chemical resistance.

Conventional reactive hot melt adhesives show excellent adhesion when chemical crosslinking is formed by moisture curing. However, a reactive hot melt adhesive hardly undergoes chemical crosslinking immediately after application, and in addition has fluidity as a characteristic of thermoplastic polymer because the temperature of the adhesive is high immediately after heat-melting. Thus, the initial adhesive strength to the substrate is not sufficient. Note that the initial adhesive strength means the adhesive strength 2 to 5 minutes after application to the substrate.

A method including blending a thermoplastic resin in a hot melt adhesive to improve the initial cohesion is known as a means for increasing the initial adhesive strength. Patent document 1 discloses improving the cohesive and adhesive strength of a urethane hot melt adhesive by adding an acrylic resin. Since the hot melt adhesive of Patent document 1 uses an acrylic resin obtained by suspension polymerization, however, it takes a lot of time and energy to dissolve the acrylic resin in polypropylene glycol and the like. In addition, acrylic resins having a high weight average molecular weight and a high glass transition temperature are preferred for good initial adhesion, but such acrylic resins require more time and energy to dissolve in polypropylene glycol.

Moreover, as adhesives used in automotive interior materials, adhesives having less volatile organic compounds which affect the human body have been desired in recent years. However, the hot melt adhesive of Patent document 1 often contains volatile organic compounds in a large amount derived from acrylic resins.

On the other hand, acrylic polymer fine particles for plastisol (Patent document 2) and additives for thermoplastic resins (Patent document 3) are known as acrylic resin powders.

Patent document 2 discloses plastisol compositions containing polyalkylene glycols and polymer particles exhibiting good storage stability under the condition of 30° C. These require a lot of energy to dissolve in polyalkylene glycols and their viscosity becomes very high even after dissolution. Thus, application to hot melt adhesives is difficult.

Patent document 3 discloses acrylic polymers having a low reduced viscosity as a lubricant for thermoplastic resins. These have no examples of dissolution in polyalkylene glycols or application to hot melt adhesives, and they do not exhibit good initial adhesive strength because of their glass transition temperature equal to or lower than room temperature.

Thus, it is desired to develop an acrylic resin for hot melt adhesives with good initial adhesion, rapid dissolution, and less volatile organic compounds.

CITATION LIST

Patent Documents

Patent document 1: Japanese Patent Application Publication No. 2010-248278
Patent document 2: International Publication No. WO 2003/004568
Patent document 3: Japanese Patent Application Publication No. Hei 2-120306

SUMMARY OF INVENTION

The present invention has been made to solve the above problems. Specifically, an object of the present invention is to provide an acrylic resin powder suitable for hot melt adhesives which dissolves in polyol components such as polyalkylene glycols faster than conventional ones, as well as a resin composition which can be produced with lower energy than conventional ones.

Means for Solution of the Problems

The present invention provides an acrylic resin powder comprising: a copolymer which contains a methyl methacrylate unit, wherein a volume average particle size (diameter) of a primary particle is 0.1 to 10 µm, a volume average particle size of a secondary particle is 20 to 80 µm, a weight average molecular weight is 10,000 to 500,000, and the acrylic resin powder is soluble in polypropylene glycol having a weight average molecular weight of 1000 under stirring at a concentration of 10% by mass at 60° C. for 60 minutes.

The present invention also provides a hot melt adhesive comprising a mixture of a urethane prepolymer and a copolymer which contains a methyl methacrylate unit, wherein a content of a vinyl-based monomer is 250 ppm or less.

More specifically, the present invention is as follows.
<1> An acrylic resin powder comprising: a copolymer which contains a methyl methacrylate unit, wherein a volume average particle size of a primary particle is 0.1 to 10 µm, a volume average particle size of a secondary particle is 20 to 80 µm, a weight average molecular weight is 10,000 to 500,000, and the acrylic resin powder is soluble in polypropylene glycol having a weight average molecular weight of 1000 under stirring at a concentration of 10% by mass at 60° C. for 60 minutes.

<2> The acrylic resin powder according to <1>, wherein the volume average particle size after ultrasonic irradiation for 5 minutes in an aqueous medium is 0.2 to 20 µm.

<3> The acrylic resin powder according to <1> or <2>, wherein a content of a vinyl-based monomer is 1000 ppm or less.

<4> A resin composition comprising the acrylic resin powder according to any one of <1> to <3> and a polyalkylene glycol.

<5> The resin composition according to <4>, wherein a weight average molecular weight of the polyalkylene glycol is 200 to 5000.

<6> The resin composition according to <4> or <5>, further comprising a polyester polyol.

<7> The resin composition according to any one of <4> to <6>, further comprising an isocyanate.

<8> A hot melt adhesive comprising the resin composition according to any one of <4> to <7>.

<9> The hot melt adhesive according to <8>, wherein the content of the vinyl-based monomer is 250 ppm or less.

<10> A hot melt adhesive comprising a mixture of a urethane prepolymer and a copolymer which contains a methyl methacrylate unit, wherein a content of a vinyl-based monomer is 250 ppm or less.

<11> A method of producing an acrylic resin powder comprising the following steps:
[Step I (A)]
obtaining a polymer dispersion (A) by polymerizing, in a medium containing water as a main component and by use of a water-soluble radical polymerization initiator, a monomer mixture (a) a polymer of which does not dissolve in the medium and which has a solubility of 0.02% by mass or more relative to the medium at 20° C. in the presence of an emulsifier having a critical micelle concentration or less,
[Step I (B)]
obtaining a polymer dispersion (B) by adding a monomer mixture (b) containing methyl methacrylate and 0.1 to 3 parts by mass of a chain transfer agent relative to 100 parts by mass of (b) dropwise to the polymer dispersion (A), followed by polymerization,
where the water-soluble radical polymerization initiator of [Step I] is 0.1 parts by mass or more when a total amount of the monomer mixtures (a) and (b) is 100 parts by mass
[Step II]
obtaining a resin powder by spray drying the polymer dispersion (B).

<12> The method according to <11>, wherein the acrylic resin powder is soluble in polypropylene glycol having a weight average molecular weight of 1000 under stirring at a concentration of 10% by mass at 60° C. for 60 minutes.

<13> The method according to <11> or <12>, wherein the water-soluble radical polymerization initiator is a persulfate.

<14> A method of producing a resin composition, comprising the step of dissolving the acrylic resin powder obtained by the production method according to any one of <11> to <13> in a polyalkylene glycol.

<15> A method of producing a hot melt adhesive, comprising the steps of: obtaining a resin composition by dissolving the acrylic resin powder obtained by the production method according to any one of <11> to <13> in a polyalkylene glycol; and obtaining a urethane prepolymer by further mixing an isocyanate.

The present invention also provides the following aspects.

(1) An acrylic resin powder comprising: a copolymer which is composed of a methyl methacrylate unit and a methacrylic acid $C_4$ to $C_8$ alkyl ester unit, wherein a primary particle is 0.1 to 10 µm, a secondary particle is 20 to 80 µm, a weight average molecular weight is 10,000 to 200,000, and the acrylic resin powder is soluble in polypropylene glycol having a weight average molecular weight of 1000 under stirring at a concentration of 10% by mass at 60° C. for 60 minutes.

(2) A resin composition comprising the acrylic resin powder according to (1) and a polyalkylene glycol.

(3) The resin composition according to (2), wherein a weight average molecular weight of the polyalkylene glycol is 200 to 5000.

(4) The resin composition according to (2) or (3), further comprising a polyester polyol.

(5) The resin composition according to any one of (2) to (4), further comprising an isocyanate.

(6) A hot melt adhesive comprising the resin composition according to any one of (2) to (5).

(7) A method of producing an acrylic resin powder comprising the following steps:
[Step I (A)]
obtaining a polymer dispersion (A) by polymerizing, in a medium containing water as a main component and by use of a water-soluble radical polymerization initiator, a monomer mixture (a) a polymer of which does not dissolve in the medium and which has a solubility of 0.02% by mass or more relative to the medium at 20° C. in the presence of an emulsifier having a critical micelle concentration or less,
[Step I (B)]
obtaining a polymer dispersion (B) coating the polymer dispersion (A) by adding a monomer mixture (b) containing methyl methacrylate and methacrylic acid $C_4$-$C_8$ alkyl ester, and 0.1 to 3 parts by mass of a chain transfer agent relative to 100 parts by mass of (b) dropwise to the polymer dispersion (A), followed by polymerization,
where the water-soluble radical polymerization initiator of [Step I] is 0.1 parts by mass or more when a total amount of the monomers (a) and (b) is 100 parts by mass
[Step II]
recovering a polymer by spray drying the polymer dispersion (B).

(8) A method of producing a resin composition, comprising the step of dissolving the acrylic resin powder obtained by the production method according to (7).

(9) A method of producing a hot melt adhesive, comprising the steps of: obtaining a resin composition by dissolving the acrylic resin powder obtained by the production method according to (7) in a polyalkylene glycol; and obtaining a polyurethane prepolymer by further mixing an isocyanate.

Advantageous Effects of Invention

The acrylic resin powder of the present invention is suitable for hot melt adhesives because it dissolves in polyalkylene glycols faster than conventional ones. In addition, since the acrylic resin powder of the present invention can dissolve with lower energy than conventional ones, it is possible to provide an adhesive composition which can be produced with low energy. Use of the acrylic resin powder of the present invention makes it possible to obtain a hot melt adhesive having excellent productivity

DESCRIPTION OF EMBODIMENTS

Hereinafter, the present invention is described in detail.
Acrylic Resin Powder
In one embodiment, the present invention is an acrylic resin powder comprising: a copolymer which contains a methyl methacrylate unit, wherein a volume average particle size of a primary particle is 0.1 to 10 μm, a volume average particle size of a secondary particle is 20 to 80 μm, a weight average molecular weight is 10,000 to 500,000, and the acrylic resin powder is soluble in polypropylene glycol having a weight average molecular weight of 1000 under stirring at a concentration of 10% by mass at 60° C. for 60 minutes.

When a total of 100 g of polypropylene glycol and acrylic resin powder is used, for example, the stirring means stirring at 250 rpm using a magnetic stirrer and an Octagon type stirring bar having a diameter of 8 mm and a length of 40 mm, using a glass sample bottle having a full volume of 144 mL, a trunk diameter of 55 mm, and an overall height of 95 mm as a container.

It is determined that "soluble in polypropylene glycol having a weight average molecular weight of 1000 under stirring at a concentration of 10% by mass at 60° C. for 60 minutes" is "soluble in polypropylene glycol" by the following determination methods A and B. That is, solubility is determined based on both of the determination methods A and B.

Determination method A: the acrylic resin powder is determined as soluble in polypropylene glycol if the acrylic resin powder and polypropylene glycol are dissolved by stirring for 60 minutes on a water bath at 60° C. with a blend of acrylic resin powder/polypropylene glycol (weight average molecular weight 1000)=10/90 (% by mass), the obtained resin composition is diluted 5 times with the polypropylene glycol (weight average molecular weight 1000), suction filtration is performed on nylon mesh gauze (300 mesh), and the filtration residue is 1% by mass or less relative to the resin composition.

Determination method B: the acrylic resin powder is determined as soluble in polypropylene glycol if the acrylic resin powder and polypropylene glycol are dissolved by stirring for 60 minutes on a water bath at 60° C. with a blend of acrylic resin powder/polypropylene glycol (weight average molecular weight 1000)=10/90 (% by mass), the obtained resin composition is diluted 5 times with the polypropylene glycol (weight average molecular weight 1000), and the degree of dispersion of the dilution measured by the method described in JIS K5600-2-5 is 20 μm or less.

(Composition of Copolymer)

The acrylic resin powder of the present invention includes a copolymer containing a methyl methacrylate unit.

If a methyl methacrylate unit is included, the initial adhesive strength of the hot melt adhesive is improved.

The methyl methacrylate unit may be 20 to 100% by mass and more preferably 20 to 80% by mass.

(Other Copolymerizable Monomers)

Examples of the other copolymerizable monomers except for the methyl methacrylate unit include (meth)acrylic acid alkyl ester units such as methyl acrylate, n-butyl (meth)acrylate, i-butyl (meth)acrylate, t-butyl (meth)acrylate, 2-ethylhexyl (meth)acrylate, and octyl (meth)acrylate; (meth)acrylic acid cycloalkyl ester units such as cyclohexyl (meth)acrylate and isobornyl (meth)acrylate; hydroxyl group-containing (meth)acrylic acid ester units such as 2-hydroxyethyl (meth)acrylate, 2-hydroxypropyl (meth)acrylate, and 4-hydroxybutyl (meth)acrylate; carboxyl group-containing monomer units such as (meth)acrylic acid, 2-(meth)acryloyl hexahydrophthalic acid, 2-(meth)acryloyloxypropyl hexahydrophthalic acid, 2-(meth)acryloyloxyethyl tetrahydrophthalic acid, 2-(meth)acryloyloxypropyl tetrahydrophthalic acid, 5-methyl-2-(meth)acryloyloxyethyl hexahydrophthalic acid, 2-(meth)acryloyloxyethyl phthalic acid, 2-(meth)acryloyloxypropyl phthalic acid, 2-(meth)acryloyloxyethyl maleic acid, 2-(meth)acryloyloxypropyl maleic acid, 2-(meth)acryloyloxyethyl succinic acid, 2-(meth)acryloyloxypropyl succinic acid, 2-(meth)acryloyloxyethyl oxalic acid, 2-(meth)acryloyloxypropyl oxalic acid, crotonic acid, fumaric acid, maleic acid, itaconic acid, and sorbic acid; carbonyl group-containing (meth)acrylic acid ester units such as 2-acetoacetoxyethyl (meth)acrylate; epoxy group-containing (meth)acrylic acid ester units such as glycidyl (meth)acrylate; amino group-containing (meth)acrylic acid ester units such as 2-dimethylaminoethyl (meth)acrylate and 2-diethylaminoethyl (meth)acrylate; styrene and its derivatives; and the like.

These may be used singly or in combination of two or more of kinds. Note that "(meth)acrylic acid" is a collective name for acrylic acid and methacrylic acid.

It is preferable to contain a methacrylic acid $C_4$ to $C_8$ alkyl ester unit which is an ester of an aliphatic alcohol having 4 to 8 carbon atoms and methacrylic acid because of good compatibility with the polyalkylene glycol. Examples of the methacrylic acid $C_4$ to $C_8$ alkyl ester unit include units such as n-butyl methacrylate, i-butyl methacrylate, t-butyl methacrylate, 2-ethylhexyl methacrylate, and octyl methacrylate. Among these, use of butyl methacrylate units which are inexpensive and easy to obtain is industrially advantageous.

In the case of containing the methacrylic acid $C_4$ to $C_8$ alkyl ester unit, the mass ratios of the monomer units relative to the total amount (100% by mass) of the monomer units constituting the acrylic resin powder are preferably as follows.

The methyl methacrylate unit is preferably 20 to 80% by mass and more preferably 35 to 70% by mass.

The methacrylic acid $C_4$ to $C_8$ alkyl ester unit is preferably 20 to 80% by mass and more preferably 30 to 65% by mass.

The other copolymerizable monomer units are preferably 0 to 20% by mass and more preferably 0 to 10% by mass.

Such mass ratios make it possible to achieve both the solubility in polyalkylene glycols and the initial adhesive strength of hot melt adhesives.

It is further preferable to contain a carboxyl group-containing monomer unit from the viewpoint that it is possible to promote the reaction between the isocyanate and the polyol in the resin composition and to improve the initial adhesion to the substrate upon application of the hot melt adhesive and the adhesive strength after curing. It is preferable to contain a methacrylic acid unit because of good copolymerizability between the methyl methacrylate unit and the methacrylic acid $C_4$ to $C_8$ alkyl ester unit.

In the case of containing the methacrylic acid $C_4$ to $C_8$ alkyl ester unit and the methacrylic acid unit, the mass ratios of the monomer units relative to the total amount (100% by mass) of the monomer units constituting the acrylic resin powder preferably have the follows ranges.

The methyl methacrylate unit is preferably 20 to 79.9% by mass and more preferably 35 to 69.7% by mass.

The methacrylic acid $C_4$ to $C_8$ alkyl ester unit is preferably 20 to 80% by mass and more preferably 30 to 64.7% by mass.

The methacrylic acid unit is preferably 0.1 to 5% by mass and more preferably 0.3 to 1% by mass.

The other copolymerizable monomer unit is preferably 0 to 20% by mass and more preferably 0 to 10% by mass.

Such mass ratios make it possible to more improve the initial adhesive strength of hot melt adhesives.

(Volume Average Particle Size of Primary Particles)

The volume average particle size of the primary particles of the acrylic resin powder of the present invention is 0.1 to 10 μm, preferably 0.1 to 5 μm, and more preferably 0.2 to 2 μm.

The primary particles in the present specification refer to polymer particles of the smallest unit constituting the acrylic resin powder. When the volume average particle size of the primary particles is 10 μm or less, the surface area of the particles becomes large and the solubility becomes good in a medium such as polyalkylene glycol. In addition, in the case of a powder with 0.1 μm or more, it is possible to control thermal fusion of the volume average particle size of the secondary particles, and to improve the dispersibility in a medium such as polyalkylene glycol.

(Volume Average Particle Size of Secondary Particles)

The volume average particle size of the secondary particles of the acrylic resin powder of the present invention is 20 to 80 μm, preferably 20 to 60 μm, and more preferably 30 to 50 μm.

The secondary particles in the present specification refer to aggregated particles of a large number of aggregated primary particles. A diameter of 20 μm or more allows easy handling because powder scattering is prevented. In addition, a diameter of 80 μm or less allows good solubility in polyalkylene glycols.

In the case of such an aggregated structure, a preferable structure is such that the primary particles do not firmly bond to each other but are loosely aggregated. Specifically, the volume average particle size after ultrasonic irradiation in an aqueous medium is preferably 0.2 to 20 μm. This range is preferable because dispersion precedes dissolution at the time of dissolution in polyalkylene glycol, resulting in increased surface area followed by faster dissolution.

(Weight Average Molecular Weight)

The weight average molecular weight of the acrylic resin powder of the present invention determined by the GPC (gel permeation chromatography) method is 10,000 to 500,000, preferably 20,000 to 200,000, more preferably 30,000 to 150,000, and further preferably 30,000 to 100,000. The initial adhesive strength of the adhesive tends to be good in the case of 10,000 or more, and the viscosity of the resin composition and the adhesive can be controlled in the case of 500,000.

(Additives in Acrylic Resin Powder)

The acrylic resin powder of the present invention may contain an additive as necessary such as a defoaming agent.

(Content of Vinyl-Based Monomer in Acrylic Resin Powder)

The content of the vinyl-based monomer contained in the acrylic resin powder of the present invention is preferably 1000 ppm or less and more preferably 500 ppm or less. The vinyl-based monomer is an unreacted monomer, specifically methyl methacrylate or a monomer shown in (Other Copolymerizable Monomers). A content of the vinyl-based monomer of 1000 ppm or less is preferable because it tends to be possible to achieve a low level of the content of the volatile organic compounds in the hot melt adhesive using the acrylic resin powder of the present invention.

(Polyalkylene Glycol)

The resin composition of the present invention may contain an acrylic resin powder and a polyalkylene glycol as a polyol component.

Specific examples of the polyalkylene glycol component include polymethylene glycol, polyethylene glycol, polypropylene glycol, polyhexamethylene glycol, polyalkylene glycols having two or more glycol units such as copolymers of ethylene oxide and propylene oxide, and branched polyalkylene glycols using polyfunctional alcohols such as glycerin. These may be used singly or in combination of two or more kinds.

The molecular weight of the polyalkylene glycol is preferably 200 to 5000 and more preferably 700 to 3000. The adhesive strength after curing the hot melt adhesive becomes good in the case of 200 or more, and the resin composition has a low viscosity a good applicability in the case of 5000 or less.

(Polyester Polyol)

The resin composition of the present invention can further include a polyester polyol. Crystalline polyester polyols and non-crystalline polyester polyols are known as polyester polyols, and specific examples thereof include aliphatic polyester polyols and aromatic polyester polyols. Distinguishment is easily made also by DSC between the crystalline polyester polyols and the non-crystalline polyester polyols. The melting point of a crystalline polyester polyol is observed by DSC measurement as an endothermic peak at the time of temperature elevation, and observed as an exothermic peak at the time of temperature lowering.

Since the melting point of a non-crystalline polyester polyol is not clearly observed in the case of DSC measurement, distinguishment from crystalline polyester polyols is possible.

It is possible to obtain an aliphatic polyester polyol by the reaction between an aliphatic dicarboxylic acid and a diol.

Examples of the aliphatic dicarboxylic acid can include adipic acid, sebacic acid, azelaic acid, and decamethylene dicarboxylic acid. These may be used singly or in combination of two or more kinds.

Examples of the diol include low molecular weight diols having 2 to 12 carbon atoms such as ethylene glycol, 1-methylethylene glycol, 1-ethylethylene glycol, propylene glycol, butanediol, pentanediol, hexanediol, heptane diol, octanediol, nonanediol, decanediol, dodecanediol, neopentyl glycol, 2-methyl-1,3-propanediol, cyclohexane dimethanol, and 2,4-dimethyl-1,5-pentanediol.

Preferable is at least one selected from the group consisting of ethylene glycol, butanediol, hexanediol, octanediol, and decanediol. These diols may be used singly or in combination of two or more kinds.

Examples of the aliphatic polyester polyol include polyhexamethylene adipate, polyhexamethylene sebacate, polyhexamethylene dodecanate, and polybutylene adipate.

The aromatic polyester polyol is preferably one obtained by the reaction between an aromatic poly (or di) carboxylic acid with the above diol. Examples of the aromatic poly (or di) carboxylic acid include phthalic acid, isophthalic acid, and terephthalic acid. These may be used singly or in combination of two or more kinds.

Examples of the aromatic polyester polyol include polyalkylene phthalates, polyalkylenc isophthalates, and polyalkylene terephthalates.

A polyether polyol as a polyol component has low viscosity and good handling property, and is suitable for dissolving acrylic resin powders. In addition, since polyester polyols have high thermal resistance and solvent resistance as well as high strength, it is preferable to use a polyalkylene glycol and a polyester polyol in combination.

(Isocyanates)

The resin composition of the present invention can further include an isocyanate.

Examples of the isocyanate used in the present invention include ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, furfurylidene diisocyanate, 1-chlorobenzene-2,4-diisocyanate, 4,4',4"-triisocyanate-triphenylmethane, 1,3,5-triisocyanate-benzene, 2,4,6-triisocyanate-toluene, and 4,4'-dimethyldiphenylmethane-2,2',5,5'-tetraisocyanate.

As the isocyanate, those having an average of 1 to 3 isocyanate groups per molecule are preferable, and bifunctional isocyanates, so-called diisocyanates are particularly preferable. The isocyanate may be used singly or in combination of two or more kinds.

Among other things, 4,4'-diphenylmethane diisocyanate is preferable from the viewpoint of high adhesive strength after moisture curing.

Although it is possible to use monools and monoisocyanates as well as trifunctional polyols and trifunctional isocyanates, bifunctional polyols (diols) and bifunctional isocyanates (diisocyanates) are preferable from the viewpoint of the viscosity of the resin composition.

Note that it is preferable to use 2 moles of bifunctional isocyanate per mole of bifunctional polyol because it is possible to relatively easily produce the desired urethane prepolymer.

Hot Melt Adhesive

It is possible to apply the resin composition of the present invention as a hot melt adhesive.

(Blend Ratio)

The hot melt adhesive contains at least an acrylic resin powder and a polyalkylene glycol as a polyol component, and may contain other polyol components and further contain an isocyanate.

When the hot melt adhesive contains an acrylic resin powder, a polyol, and an isocyanate, it is preferable that the acrylic resin powder be 1 to 50 parts by mass and the total amount of the polyol and the isocyanate be 50 to 99 parts by mass, and it is further preferable that the acrylic resin powder be 5 to 30 parts by mass and the total amount of the polyol and the isocyanate be 70 to 95 parts by mass relative to the total amount of the acrylic resin powder, the polyol, and the isocyanate.

When the acrylic resin powder is 1 part by mass or more, the initial adhesive strength tends to be good. In addition, when the acrylic resin powder is 50 parts by mass or less, the adhesive strength after curing tends to be improved.

(Other Additives)

Examples of other additives for the hot melt adhesive include plasticizers such as dioctyl phthalate, dibutyl phthalate, and dioctyl adipate; antioxidants such as phenol-based antioxidants, phosphate-based antioxidants, and thioether-based antioxidants, and amine-based antioxidants; pigments such as titanium oxide and carbon black; light stabilizers such as benzotriazole, hindered amine, benzoate, and benzotriazole; flame retardants such as halogen-based flame retardants, phosphorus-based flame retardants, antimony-based flame retardants, and metal hydroxide flame retardants; metal-based catalysts, for example tin-based catalysts (trimethyl tin laurate, trimethyl tin hydroxide, dibutyl tin dilaurate, dibutyl tin maleate, and the like), lead-based catalysts (lead oleate, lead naphthenate, lead octenate, and the like), and other metal-based catalysts (metal salts of naphthenic acid such as cobalt naphthenate and the like) as well as amine-based catalysts, for example curing catalysts such as triethylenediamine, tetramethylethylenediamine, tetramethylhexylenediamine, diazabicycloalkenes, dialkylaminoalkylamines, bis(2-dimethylaminoethyl)ether, and dimorpholino diethyl ether; and waxes such as paraffin wax and microcrystalline wax.

In addition, it is possible to add, if necessary, wetting agents, thickeners, defoaming agents, rheology control agents, and the like.

(Content of Vinyl-Based Monomer in Adhesive)

The content of the vinyl-based monomer contained in the hot melt adhesive of the present invention is preferably 250 ppm or less. The vinyl-based monomer is an unreacted monomer, specifically methyl methacrylate or a monomer shown in (Other Copolymerizable Monomers). This is because use of the acrylic resin powder of the present invention makes it possible to achieve a low level of the content of the volatile organic compounds in the hot melt adhesive.

Method of Producing Acrylic Resin Powder

In one embodiment, the present invention provides the following method of producing acrylic resin powder.

[Step I (A)]

A step of obtaining a polymer dispersion (A) by polymerizing, in a medium containing water as a main component and by use of a water-soluble radical polymerization initiator, a monomer mixture (a) a polymer of which does not dissolve in the medium and which has a solubility of 0.02% by mass or more relative to the medium at 20° C. in the presence of an emulsifier having a critical micelle concentration or less.

[Step I (B)]

A step of obtaining a polymer dispersion (B) by adding a monomer mixture (b) and 0.1 to 3 parts by mass of a chain transfer agent relative to 100 parts by mass of (b) dropwise to the polymer dispersion (A), followed by polymerization, where the water-soluble radical polymerization initiator of [Step I] is 0.1 parts by mass or more when a total amount of the monomer mixtures (a) and (b) is 100 parts by mass.

[Step II]

A step of recovering a polymer by spray drying the polymer dispersion (B).

[Step I (A)]

[Step I (A)] is a step of obtaining a polymer dispersion (A) by polymerizing, in a medium containing water as a main component and by use of a water-soluble radical polymerization initiator, a monomer mixture (a) a polymer of which does not dissolve in the medium and which has a solubility of 0.02% by mass or more relative to the medium at 20° C. in the presence of an emulsifier having a critical micelle concentration or less.

The presence of an emulsifier having a critical micelle concentration or less in a medium containing water as a main component makes it possible to prepare seed particles having a relatively large particle size. When seed particles having a relatively large particle size are prepared, the production of new particles in the following [Step I (B)] can be suppressed, and the particle size of the obtained polymer becomes relatively large. As a result, the acrylic resin powder obtained in [Step II] has good dispersibility in a medium such as polyalkylene glycols.

(Emulsifier)

Examples of the emulsifier used in the above production method include anionic surfactants or nonionic surfactants.

Specific examples of the anionic surfactants include alkyl benzene sulfonates, alkyl sulfonates, alkyl sulfate ester salts, fatty acid metal salts, polyoxyalkylether sulfuric acid ester salts, polyoxyethylene carboxylic acid ester sulfuric acid ester salts, polyoxyethylene alkyl phenyl ether sulfate salts, and succinic acid dialkyl ester sulfonates (such as disodium dioctyl sulfosuccinate). These may be used singly or in combination of two or more kinds.

Specific examples of the nonionic surfactants include polyoxyethylene alkyl phenyl ethers, polyoxyethylene alkyl ethers, polyoxyethylene fatty acid esters, polyoxyethylene sorbitan fatty acid esters, polyoxyethylene alkyl ether glycerin borate esters, polyoxyethylene alkyl ether phosphate esters, compounds having polyoxyethylene chains such as polyoxyethylene in the molecules and having a surfactant property, compounds in which the polyoxyethylene chains of these compounds is replaced by copolymers of oxyethylene and oxypropylene, sorbitan fatty acid esters, fatty acid glycerin esters, glycerin fatty acid esters, and pentaerythritol fatty acid esters. These may be used singly or in combination of two or more kinds.

For the critical micelle concentration, it is possible to adopt the value of the New Edition∩Surfactant Handbook (Heisei 12, 4th edition, edited by Kogyo Tosho Co., Ltd.). For example, the critical micelle concentration of sodium n-dodecylbenzenesulfonate is 1.2 mmol/L (75° C.), and the critical micelle concentration of disodium dioctyl sulfosuccinate is 0.7 g/L (25° C.).

(Monomer Mixture (a))

In a medium containing water as a main component, the monomer mixture (a) is a monomer mixture a polymer of which does not dissolve in the medium and which has a solubility of 0.02% by mass or more relative to the medium at 20° C. In the case of a monomer having a solubility of only less than 0.02% by mass relative to the medium, the seed polymerization itself is very hard to proceed. In addition, when the polymer obtained from the monomer dissolves in the medium, it is impossible to obtain seed particles in the first place because no particles are formed.

The monomer used for the monomer mixture (a) may be one having a solubility of 0.02% by mass or more relative to the medium, and examples thereof include (meth)acrylic acid alkyl esters such as methyl (meth)acrylate, butyl (meth)acrylate, 2-ethylhexyl (meth)acrylate, and octyl (meth)acrylate; (meth)acrylic acid cycloalkyl esters such as cyclohexyl (meth)acrylate; and hydroxyl group-containing (meth) acrylic acid esters such as 2-hydroxyethyl (meth)acrylate, 2-hydroxypropyl (meth)acrylate, and 4-hydroxybutyl (meth) acrylate. These may be used singly or in combination of two or more kinds.

It is preferable to use a combination of methyl methacrylate and a $C_4$ to $C_8$ alkyl methacrylate ester from the viewpoint of polymerization stability.

(Water-Soluble Radical Polymerization Initiator)

Examples of the water-soluble radical polymerization initiator include persulfates such as potassium persulfate, ammonium persulfate, and sodium persulfate; water-soluble azo compounds such as 2,2' azobis(2-amidinopropane)trihydrochloride, and 4,4'-azobis(4-cyanopentanoic acid); thermally decomposable polymerization initiators such as hydrogen peroxide; and redox-based polymerization initiators such as hydrogen peroxide and ascorbic acid, tert-butyl hydroperoxide and Rongalite, potassium persulfate and a metal salt, and ammonium persulfate and sodium hydrogensulfite. These polymerization initiators may be used singly or in combination of two or more kinds.

Among other things, it is preferable to use a persulfate because it is suitable for soap-free polymerization capable of obtaining relatively large seed particles.

[Step I (B)]

[Step I (B)] is a step of obtaining a polymer dispersion (B) covering the polymer dispersion (A) by adding a monomer mixture (b) and 0.1 to 3 parts by mass of a chain transfer agent relative to 100 parts by mass of (b) dropwise to the polymer dispersion (A), followed by polymerization.

(Monomer Mixture (b))

The monomer mixture (b) contains methyl methacrylate, and may contain the same monomers as those exemplified as "Other Copolymerizable Monomers" as other monomers.

(Chain Transfer Agent)

It is preferable to use a chain transfer agent for the purpose of adjusting the molecular weight of the resulting polymer.

Examples of the chain transfer agent include mercaptans such as n-dodecyl mercaptan; thioglycolic acid esters such as octyl thioglycolate; and α-methylstyrene dimer and terpinolene. Among other things, primary or secondary mercapto compounds are preferable because the polymer obtained by polymerization has good initial adhesive strength and good adhesion to the substrate.

Examples of the primary or secondary mercapto compounds include alkyl mercaptans such as n-butyl mercaptan, sec-butyl mercaptan, n-octyl mercaptan, n-dodecyl mercaptan, and n-octadecyl mercaptan; thioglycolic acid esters such as 2-ethylhexyl thioglycolate, methoxybutyl thioglycolate, and trimethylolpropane tris(thioglycolate); mercaptopropionic acid esters such as 2-ethylhexyl β-mercaptopropionate, 3-methoxybutyl β-mercaptopropionate, and trimethylolpropane tris(β-thiopropionate).

These may be used singly or in combination of two or more kinds. Among other things, n-octyl mercaptan, n-dodecyl mercaptan, and 2-ethylhexyl thioglycolate having a large chain transfer constant are preferable.

The amount of the chain transfer agent used is preferably in a range of 0.1 to 3 parts by mass and more preferably in a range of 0.3 to 2 parts by mass relative to 100 parts by mass of the monomer mixture (b).

When the amount of the chain transfer agent used is 0.1 parts by mass or more, the molecular weight of the copolymer is reduced due to chain transfer of the radical, and the adhesion to the substrate is improved. In addition, when the amount of the chain transfer agent used is 3 parts by mass or less, the residual amount of unreacted monomer or chain transfer agent decreases, and odor decreases.

The chain transfer agent may be added by mixing in the monomer mixture (b), or may be added by dropwise addition simultaneously with the dropwise addition of the monomer mixture (b).

(Emulsifier)

[Step I (B)] may use an emulsifier. As the emulsifier to be used, it is possible to use the same ones as the emulsifiers exemplified as usable ones in [Step I (A)].

(Polymerization)

[Step I (B)] may use a radical polymerization initiator. As the radical polymerization initiator to be used, it is possible to use the same ones as the water-soluble radical polymerization initiators exemplified as usable ones in [Step I (A)].

(Amount of Polymerization Initiator)

Let the total mass of the monomer mixtures (a) and (b) be 100. When the water-soluble radical polymerization initiator used in [Step I] is 0.1 parts by mass or more, an acrylic resin powder having good solubility in polyalkylene glycols is obtained, and the viscosity of the resin composition dissolved in the polyalkylene glycol decreases to improve the handling property. More preferably, the water-soluble radical polymerization initiator is 0.2 to 1.0 parts by mass when the total mass of the monomer mixtures (a) and (b) is 100.

The polymerization temperature of [Step I (A)] and [Step I (B)] may be set depending on the type of polymerization initiator and polymerization conditions. For example, in the case of singly using a water-soluble inorganic peroxide such as potassium persulfate or ammonium persulfate as a polymerization initiator, polymerization is possible at a temperature equal to or higher than the 10-hour half-life temperature of the polymerization initiator.

Temperatures higher than the 10-hour half-life temperature of the polymerization initiator by 5° C. or more are particularly preferable from the viewpoints of stability of polymerization and shortening of time.

The polymerization time of [Step I (A)] and [Step I (B)] may be set depending on the type of polymerization initiator and polymerization conditions. Although the suitable polymerization time varies depending on the polymerization temperature, it is preferable to carry out polymerization within the time period during which thermal decomposition of the polymerization initiator takes place to produce radicals.

[Step II] is a step of collecting the polymer by spray drying the polymer dispersion (B) described above.

The secondary or higher order structure is not particularly limited as long as the acrylic resin powder of the present invention is composed of primary particles which are covered with the monomer mixture (b) added dropwise to the polymer dispersion (A) described above. For example, it is possible to take a secondary structure such as primary particles aggregated with weak cohesion, aggregated with strong cohesion, or mutually fused by heat, and it is also possible to have a higher order structure by processing such as granulation of these secondary particles.

It is possible to design these higher order structures according to usage and requirements for the purpose of improving workability, for example preventing the powder scattering of powder and improving fluidity as well as for the purpose of improving the physical properties, for example improving the dispersion state of the powder in polyalkylene glycols.

For example, formation as a powder is possible by the spray drying method or acid coagulation or salt coagulation followed by drying. The spray drying method is particularly preferable because primary particles do not firmly bond to each other and can easily be in the state of primary particles with a weak shearing force.

It is possible to obtain a resin composition by dissolving the acrylic resin powder obtained by the above production method in a polyalkylene glycol.

As a dissolution method, for example, dissolution is possible by adding and dispersing an acrylic resin powder in a polyalkylene glycol, followed by heating and mixing.

The heating temperature is not particularly limited as long as it is a temperature at which the acrylic resin powder dissolves, but dissolution is possible at a low temperature or in a short period of time as compared with the case of using the acrylic resin powder obtained by suspension polymerization. Dissolution is also possible by simultaneous addition of the acrylic resin powder and a polyester polyol. After that, it is preferable that a defoaming agent be added if necessary, and moisture in the resin composition be sufficiently removed under stirring while heating under reduced pressure using a vacuum pump or the like.

As the polyalkylene glycol to be used, it is possible to use the same ones as those exemplified in the paragraphs of polyalkylene glycol which may be contained in the resin composition of the present invention. A polyester polyol may be used in combination. As the polyester polyol, it is possible to use the same ones as those exemplified in the paragraphs of polyester polyol which may be contained in the resin composition of the present invention.

It is possible to obtain a urethane prepolymer by dissolving the acrylic resin powder obtained by the production method described above in the polyalkylene glycol and then adding an isocyanate for heating and mixing.

The polyester polyol may be dissolved by heating and mixing after the acrylic resin powder is added to the polyalkylene glycol, or may be added simultaneously to the isocyanate for heating and mixing.

It is possible to contain other additives as long as they do not adversely affect the reaction between the isocyanate and the polyol forming the urethane prepolymer. Although the timing of addition is not particularly limited, other additives may be added with the polyol and the isocyanate in the synthesis of the urethane prepolymer or may be added after prior reaction between the polyol and the isocyanate to synthesize the urethane prepolymer. As the additive, it is possible to use the same ones as the additives exemplified as other additives for the hot melt adhesive.

The heating temperature is in a range of preferably 80 to 140° C. and more preferably 90 to 110° C. In this heating temperature range, the dissolution of each component is good, the viscosity decreases, and the handling property becomes good. Moreover, the reaction of isocyanate and polyalkylene glycol proceeds sufficiently.

(Usage of Adhesive)

The obtained resin composition can be applied as a hot melt adhesive. It can be used in the fields where hot melt adhesives are conventionally used, such as the field of building interiors (or fields of construction), the field of electronic materials, and the field of automobile interiors.

The usage of the hot melt adhesives described above is suitable for bonding automobile interiors and bonding cosmetic materials to building interiors. However, their usage is not particularly limited, and they can be used for woodworking, paper processing, fiber processing, general use, and the like.

The hot melt adhesive of the present invention can be used by the same method as those for conventional hot melt adhesives, and the use thereof is not particularly limited. Furthermore, for example, when an adherend is bonded to a substrate, the hot melt adhesive may be applied to the substrate side and/or the adherend side.

The adherend and the substrate may be usually used ones. Examples thereof can include molding materials, film sheets, fibrous materials obtained by knitting synthetic fibers or natural fibers with a spinning machine to form a sheet, and the like.

Although molding materials, films, and sheets are not particularly limited, thermoplastic resins are preferable. Examples thereof can include polyolefin resins, polyester resins, acetate resins, polystyrene resins, ABS resins, vinyl chloride resins, and polycarbonate resins. Examples of the polyolefin resins can include polyethylene and polypropylene, and examples of the polyester resins can include polyethylene terephthalate.

Specifically, the laminate obtained by bonding the adherend and the substrate with the hot melt adhesive of the present invention can be used for various uses such as in the fields of construction, electronic materials, and automobiles. There is no need to use special equipment to produce the laminate, and the production is possible by using generally known production equipment including a conveyor, a coater, a press machine, a heater, and a cutting machine. For example, the laminate can be produced as follows. The hot melt adhesive of the present invention is applied to the base material or the adherend with a coater while allowing the base material and the adherend to flow with a conveyor. The temperature at the time of coating is controlled at a predetermined temperature with a heater. The adherend is weakly pressed against the substrate with a press machine, and the adherend and the substrate are bonded to each other with the hot melt adhesive. Thereafter, the bonded adherend and substrate are allowed to cool and flow in the conveyor as it is, thereby solidifying the hot melt adhesive. Thereafter, the base material to which the adherend is bonded is cut-processed into an appropriate size by a cutting machine.

In these laminated products, the hot melt adhesive of the present invention has high initial adhesive strength and is excellent in heat resistance after moisture curing. Therefore, even in the summer season, the base material and the adherend are less likely to peel off.

Note that it is possible for the worker to apply the adhesive without using a coater to produce a laminate.

EXAMPLES

Hereinafter, the present invention is described in detail with reference to Examples. Note that the present invention is not limited to these examples.

Various measurement and evaluation methods are as follows.

[Weight Average Molecular Weight]

The values in terms of polystyrene of the obtained resin powders measured by the GPC (gel permeation chromatography) method under the following conditions were defined as the weight average molecular weight of the polymer.

Apparatus: high-performance GPC apparatus HLC-8220 GPC manufactured by Tosoh Corporation Column: Four TSKgel Super HZM-M manufactured by Tosoh Corporation were connected in series Oven temperature: 40° C.

Eluent: tetrahydrofuran

Sample concentration: 0.1% by mass

Flow rate: 0.35 mL/min

Injection volume: 1 μL

Detector: RI (differential refractometer)

[Volume Average Particle Size of Primary Particles and Volume Average Particle Size of Secondary Particles]

The particle sizes of the obtained acrylic resin powder and the polymer dispersion were measured by using a laser diffraction/scattering type particle size distribution analyzer LA-960 manufactured by Horiba, Ltd. The particle size used in the present specification was the median diameter (volume average particle size). The relative refractive indexes of the resin particles and the dispersion medium were all set to 1.12. Ion exchange water was used as the dispersion medium.

[Volume Average Particle Size after Ultrasonic Irradiation]

The particle size of the acrylic resin powder was measured after irradiation with ultrasonic waves (intensity 3) for 5 minutes in ion exchanged water by using a laser diffraction/scattering type particle size distribution analyzer LA-960 manufactured by Horiba, Ltd.

[Content of Vinyl-Based Monomer in Acrylic Resin Powder]

The content of the vinyl-based monomer remaining in the obtained acrylic resin powder was measured with a gas chromatograph HP-7890A manufactured by Agilent (column: HP-5, manufactured by Agilent).

[Filtration Residue (Determination Method A)]

The blend of acrylic resin powder/polypropylene glycol (weight average molecular weight 1000)=10 g/90 g was stirred in a water bath at 60° C. for 30 minutes or 60 minutes and dissolved. The stirring was carried out at 250 rpm using a magnetic stirrer and an Octagon type stirring bar having a diameter of 8 mm and a length of 40 mm, using a glass sample bottle having a full volume of 144 mL, a trunk diameter of 55 mm, and an overall height of 95 mm as a container.

The obtained resin composition was diluted 5 times with polypropylene glycol (weight average molecular weight of about 1000, trade name of Adeka Polyether P-1000, manufactured by ADEKA corporation), which was then subjected to suction filtration on a nylon mesh gauze (300 mesh) to calculate the filtration residue for the composition in % by mass.

filtration residue(% by mass)=filtration residue (g)/
undiluted resin composition(g)×100

[Degree of Dispersion (Determination Method B)]

The blend of acrylic resin powder/polypropylene glycol (weight average molecular weight 1000)=10/90 (% by mass) was stirred in a water bath at 60° C. for 30 minutes or 60 minutes and dissolved. The stirring was carried out at 250 rpm using a magnetic stirrer and an Octagon type stifling bar having a diameter of 8 mm and a length of 40 mm, using a glass sample bottle having a full volume of 144 mL, a trunk diameter of 55 mm, and an overall height of 95 mm as a container.

The obtained resin composition was diluted 5 times with polypropylene glycol (weight average molecular weight of about 1000, trade name of Adeka Polyether P-1000, manufactured by ADEKA corporation), which was subjected to the measurement of the degree of dispersion of the particles in the resin composition by the method described in JIS K5600-2-5. The measurement was carried out using a twin groove grind meter, 0 to 50 μm (manufactured by Taiyu Kizai Co., Ltd.). When spots were observed, the points were recorded where 5 or more spots were observed in 3 mm width. When particle streaks were observed, the points were recorded where 5 or more starting points of the streaks were observed in 3 mm width. Three test results were averaged.

[Initial Adhesive Strength]

Two wooden flat bars (width 2 cm, length 7.5 cm, thickness 1.5 mm) were prepared, and a hot melt adhesive heated and melted at 120° C. was applied to one of them in an area of 2 cm×16.3 cm. After keeping it for 30 seconds as it is, the other wooden flat bar was placed on. The wooden flat bars were sandwiched with a double clip and allowed to stand for 4 minutes to cool and solidify the hot melt adhesive. The double clip was removed after standing, and a tensile shear test was immediately carried out with the following tensile tester to measure the initial adhesive strength.

Tensile testing machine: universal precise test machine AGS-X, manufactured by Shimadzu Corporation Measurement condition: tensile speed 5.0 mm/min Distance between chucks: 50 mm The initial adhesive strength was evaluated using the obtained measured values based on the following criteria. The initial adhesive strength is favorable if it is 0.1 MPa or more.

Criteria for Evaluation
AA: 0.20 MPa or more
A: 0.15 MPa or more and less than 0.20 MPa
B: 0.10 MPa or more and less than 0.15 MPa
C: less than 0.10 MPa
[Evaluation of Failure Pattern]
Evaluation was made as follows based on the destruction format described in JIS K6866.
CF: cohesive failure
SCF: special cohesive failure (thin layer cohesive failure)
AF: adhesive failure (interface failure)
[Open Time]
The adhesive was applied in the same way as in the initial adhesive strength. After keeping for 1 minute, 2 minutes, 5 minutes, and 10 minutes, the other wooden flat bar was placed on for sandwiching with a double clip. After standing for 4 minutes, the hot melt adhesive was cooled and solidified. After the standing, a tensile shear test was carried out in the same way as in the initial adhesive strength. The open time limit was defined as the time when the adhesive strength became less than 0.10 MPa or the time when the fractured surface ceased to be CF.

<Example 1> Acrylic Resin Powder (P-1)

[Step I (A)]
In a 2-liter four-necked flask equipped with a thermometer, a nitrogen gas inlet tube, a stirring rod, a dropping funnel, and a cooling tube, 544 g of ion exchange water was placed and nitrogen gas was passed therethrough for 30 minutes to replace the dissolved oxygen in the ion exchange water. Then, the passing of the nitrogen gas was stopped, and the temperature was raised to 80° C. while stirring at 200 rpm. When the internal temperature reached 80° C., the monomer mixture (a) composed of 26.1 g of methyl methacrylate and 19.9 g of n-butyl methacrylate was introduced all at once, and 0.80 g of potassium persulfate and 32 g of ion exchanged water were introduced. The mixture was kept for 45 minutes to obtain a polymer dispersion (A). The solubility of the monomer mixture (a) in ion exchange water was 0.99% by mass (0.02% by mass or more).
[Step I (B)]
To the polymer dispersion (A) obtained in [Step I (A)], 1.6 g of potassium persulfate and 64 g of ion exchange water were added. Fifteen minutes later, the acrylic monomer mixture (b) composed of 529.1 g of methyl methacrylate, 220.1 g of n-butyl methacrylate, 4.8 g of methacrylic acid, 6.9 g of Pelex OT-P (disodium dioctyl sulfosuccinate, active ingredient 70%, manufactured by Kao Corporation), 8 g of n-octyl mercaptan, and 400 g of ion exchange water was added dropwise over 5 hours. The polymerization was completed by keeping the temperature at 80° C. for 1 hour to obtain a polymer dispersion (B-1). Polymerization was carried out in an environment in which 25 ml of nitrogen gas was passed through per minute.
[Step II]
This polymer dispersion (B-1) was spray dried using Model L-8i Spray Dryer (manufactured by Ohkawara Kakohki Co., Ltd.) under the conditions of inlet temperature/outlet temperature=150/65° C. and a disk rotational speed of 20,000 rpm to obtain an acrylic resin powder (P-1).
Regarding the acrylic resin powder (P-1), the weight average molecular weight was 57000, the volume average particle size of primary particles was 0.53 μm, the volume average particle size of secondary particles was 38.2 μm, and the volume average particle size after ultrasonic irradiation was 0.8 μm. The content of the vinyl-based monomer in the acrylic resin powder (P-1) was 380 ppm.

While stirring 90 g of polypropylene glycol (weight average molecular weight of about 1000, trade name Adeka Polyether P-1000, manufactured by ADEKA corporation) with a stirrer, 10 g of the acrylic resin powder (P-1) was added. The mixture was further stirred for 30 minutes on a water bath at 60° C. to obtain a resin composition. After heating and stirring for 30 minutes, the filtration residue was 0.2% by mass and the degree of dispersion was 15 μm. The results are shown in Table 1-1.

The stirring was carried out at 250 rpm using a magnetic stirrer and an Octagon type stirring bar having a diameter of 8 mm and a length of 40 mm, using a glass sample bottle having a full volume of 144 mL, a trunk diameter of 55 mm, and an overall height of 95 mm as a container.

<Example 2> Acrylic Resin Powder (P-2)

An acrylic resin powder (P-2) was produced in the same method as in Example 1 except that the acrylic monomer mixture (b) and the chain transfer agent were changed in mass as shown in Table 1.
A resin composition was obtained in exactly the same manner as in Example 1 except that the acrylic resin powder (P-2) was used. After heating and stirring for 30 minutes, the filtration residue was 0.1% by mass and the degree of dispersion was 16 μm. The results are shown in Table 1-1.

<Example 3> Acrylic Resin Powder (P-3)

An acrylic resin powder (P-3) was produced in the same method as in Production Example 1 except that the acrylic monomer mixture (b) and the chain transfer agent were changed in mass as shown in Table 1.
A resin composition was obtained in exactly the same manner as in Example 1 except that the acrylic resin powder (P-3) was used. After heating and stirring for 30 minutes, the filtration residue was 0.1% by mass and the degree of dispersion was 15 μm. The results are shown in Table 1-1.

<Example 4> Acrylic Resin Powder (P-4)

An acrylic resin powder (P-4) was produced in the same method as in Production Example 1 except that the chain transfer agent was changed in mass as shown in Table 1.
A resin composition was obtained in exactly the same manner as in Example 1 except that the acrylic resin powder (P-4) was used. After heating and stirring for 30 minutes, the filtration residue was 0.1% by mass and the degree of dispersion was 12 μm. The results are shown in Table 1-1.

<Example 5> Acrylic Resin Powder (P-5)

An acrylic resin powder (P-5) was produced in the same method as in Production Example 1 except that the chain transfer agent was changed in mass as shown in Table 1.
A resin composition was obtained in exactly the same manner as in Example 1 except that the acrylic resin powder (P-5) was used. After heating and stirring for 30 minutes, the filtration residue was 0.1% by mass and the degree of dispersion was 15 μm. The results are shown in Table 1-1.

<Example 6> Acrylic Resin Powder (P-6)

An acrylic resin powder (P-6) was produced in the same method as in Production Example 1 except that 0.05 parts of Pelex OT-P (sodium dialkylsulfosuccinate, active ingredient 70%, manufactured by Kao Corporation) were used in [Step I (A)] as the emulsifier.

A resin composition was obtained in exactly the same manner as in Example 1 except that the acrylic resin powder (P-6) was used. After heating and stirring for 30 minutes, the filtration residue was 0.1% by mass and the degree of dispersion was 18 µm. The results are shown in Table 1-2.

<Example 7> Acrylic Resin Powder (P-7)

An acrylic resin powder (P-7) was produced in the same method as in Production Example 1 except that 0.15 parts of Neopelex G-15 (sodium dodecylbenzenesulfonate, active ingredient 15%, manufactured by Kao Corporation) were used in [Step I (A)] as the emulsifier.

A resin composition was obtained in exactly the same manner as in Example 1 except that the acrylic resin powder (P-7) was used. After heating and stirring for 30 minutes, the filtration residue was 0.1% by mass and the degree of dispersion was 18 µm. The results are shown in Table 1-2.

<Example 8> Acrylic Resin Powder (P-8)

An acrylic resin powder (P-8) was produced in the same method as in Production Example 1 except that the chain transfer agent was changed in mass as shown in Table 1-2.

A resin composition was obtained in exactly the same manner as in Example 1 except that the acrylic resin powder (P-8) was used. After heating and stirring for 30 minutes, the filtration residue was 16.7% by mass and the degree of dispersion was a value greater than 50 µm. The filtration residue exceeded 10% by mass of the amount added, and the acrylic resin powder was swollen in polypropylene glycol. After further heating and stirring for 30 minutes, the filtration residue was 0.3% by mass and the degree of dispersion was 17 µm. The results are shown in Table 1-2.

<Example 9> Acrylic Resin Powder (P-9)

An acrylic resin powder (P-9) was produced in the same method as in Production Example 1 except that the chain transfer agent was changed in mass as shown in Table 1 and the polymerization initiator was not added in [Step I (B)].

A resin composition was obtained in exactly the same manner as in Example 1 except that the acrylic resin powder (P-9) was used. After heating and stirring for 30 minutes, the filtration residue was 27.1% by mass and the degree of dispersion was a value greater than 50 µm. The filtration residue exceeded 10% by mass of the amount added, and polypropylene glycol was swollen in the acrylic resin powder. After further heating and stirring for 30 minutes, the filtration residue was 0.4% by mass and the degree of dispersion was 16 µm. The results are shown in Table 1-2.

<Comparative Example 1> Acrylic Resin Powder (P-10)

An acrylic resin powder (P-10) was produced in the same method as in Production Example 1 except that the polymerization initiator of [Step I (A)] was changed in mass as shown in Table 1, the polymerization initiator was not added in [Step I (B)], and the chain transfer agent was not used. Regarding the (P-10), the weight average molecular weight was 803,000, the volume average particle size of primary particles was 0.58 µm, and the volume average particle size of secondary particles was 40.2 µm.

A resin composition was obtained in exactly the same manner as in Example 1 except that the acrylic resin powder (P-10) was used. After stirring for 30 minutes, the filtration residue was 12.0% by mass, and in the grindometer, marked particle streaks were observed at a value greater than 50 µm. Despite further stirring for 30 minutes, the filtration residue was 31.1% and marked particle streaks were observed from 50 µm in the grindometer, and the dissolution was not completed. The results are shown in Table 1-2.

TABLE 1-1

|  |  |  | Example 1 P-1 | Example 2 P-2 | Example 3 P-3 | Example 4 P-4 | Example 5 P-5 |
|---|---|---|---|---|---|---|---|
| Step I (A) | Monomer Mixture (a) (g) | MMA | 26.1 | 26.1 | 26.1 | 26.1 | 26.1 |
|  |  | n-BMA | 19.9 | 19.9 | 19.9 | 19.9 | 19.9 |
|  | Emulsifier (g) | G-15 | — | — | — | — | — |
|  |  | OT-P | — | — | — | — | — |
|  | Polymerization Initiator (g) | KPS | 0.8 | 0.8 | 0.8 | 0.8 | 0.8 |
| Step I (B) | Polymerization Initiator (g) | KPS | 1.6 | 1.6 | 1.6 | 1.6 | 1.6 |
|  | Monomer Mixture (b) (g) | MMA | 529.1 | 289.1 | 529.1 | 529.1 | 529.1 |
|  |  | n-BMA | 220.1 | 460.1 | 220.1 | 220.1 | 212.1 |
|  |  | n-BA | — | — | — | — | 8.0 |
|  |  | MAA | 4.8 | 4.8 | 4.8 | 4.8 | 4.8 |
|  | Emulsifier (g) | OT-P | 6.9 | 6.9 | 6.9 | 6.9 | 6.9 |
|  | Chain Transfer Agent (g) | n-OM | 4.0 | 2.4 | 8.0 | 16.0 | 8.0 |
| Weight Average Molecular Weight (in unit of ten thousand) |  |  | 5.7 | 8.0 | 4.0 | 3.6 | 3.7 |
| Volume Average Particle Size of Primary Particles (µm) |  |  | 0.53 | 0.63 | 0.57 | 0.58 | 0.68 |
| Volume Average Particle Size of Secondary Particles (µm) |  |  | 38.2 | 41.5 | 44.0 | 39.9 | 44.5 |
| Volume Average Particle Size After Ultrasonic Irradiation (µm) |  |  | 0.8 | 39.0 | 0.8 | 0.8 | 0.8 |
| Content of Vinyl-Based Monomer (ppm) |  |  | 380 | 250 | 370 | 240 | 340 |
| Amount of Aqueous Initiator (Parts by Mass) (Total of Monomers (a) and (b) is set to 100) |  |  | 0.30 | 0.30 | 0.30 | 0.30 | 0.30 |
| Amount of Chain Transfer Agent (Parts by Mass) (Monomer (b) is set to 100) |  |  | 0.53 | 0.32 | 1.06 | 2.12 | 1.06 |

TABLE 1-1-continued

|  |  |  | Example 1 P-1 | Example 2 P-2 | Example 3 P-3 | Example 4 P-4 | Example 5 P-5 |
|---|---|---|---|---|---|---|---|
| Solubility | 60° C. × 30 Min | Filtration Residue (% by Mass) | 0.2 | 0.1 | 0.1 | 0.1 | 0.1 |
|  |  | Degree of Dispersion (μm) | 15 | 16 | 15 | 12 | 15 |
|  | 60° C. × 60 Min | Filtration Residue (% by Mass) | — | — | — | — | — |
|  |  | Degree of Dispersion (μm) | — | — | — | — | — |

TABLE 1-2

|  |  |  | Example 6 P-6 | Example 7 P-7 | Example 8 P-8 | Example 9 P-9 | Comparative Example 1 P-10 |
|---|---|---|---|---|---|---|---|
| Step I (A) | Monomer Mixture (a) (g) | MMA | 26.1 | 26.1 | 26.1 | 26.1 | 26.1 |
|  |  | n-BMA | 19.9 | 19.9 | 19.9 | 19.9 | 19.9 |
|  | Emulsifier (g) | G-15 | — | 1.2 | — | — | — |
|  |  | OT-P | 0.4 | — | — | — | — |
|  | Polymerization Initiator (g) | KPS | 0.8 | 0.8 | 0.8 | 0.8 | 0.4 |
| Step I (B) | Polymerization Initiator (g) | KPS | 1.6 | 1.6 | 1.6 | — | — |
|  | Monomer Mixture (b) (g) | MMA | 529.1 | 529.1 | 529.1 | 529.1 | 529.1 |
|  |  | n-BMA | 220.1 | 220.1 | 220.1 | 220.1 | 220.1 |
|  |  | n-BA | — | — | — | — | — |
|  |  | MAA | 4.8 | 4.8 | 4.8 | 4.8 | 4.8 |
|  | Emulsifier (g) | OT-P | 6.9 | 6.9 | 6.9 | 6.9 | 6.9 |
|  | Chain Transfer Agent (g) | n-OM | 8.0 | 8.0 | 0.8 | 0.8 | — |
| Weight Average Molecular Weight (in unit of ten thousand) |  |  | 5.8 | 5.2 | 12.1 | 18.8 | 80.3 |
| Volume Average Particle Size of Primary Particles (μm) |  |  | 0.48 | 0.27 | 0.57 | 0.59 | 0.58 |
| Volume Average Particle Size of Secondary Particles (μm) |  |  | 42.6 | 44.8 | 41.2 | 40.3 | 40.2 |
| Volume Average Particle Size After Ultrasonic Irradiation (μm) |  |  | 1.5 | 38.4 | 0.8 | 0.8 | 0.8 |
| Content of Vinyl-Based Monomer (ppm) |  |  | <100 | <100 | 660 | 650 | 400 |
| Amount of Aqueous Initiator (Parts by Mass) (Total of Monomers (a) and (b) is set to 100) |  |  | 0.30 | 0.30 | 0.30 | 0.10 | 0.05 |
| Amount of Chain Transfer Agent (Parts by Mass) (Monomer (b) is set to 100) |  |  | 1.06 | 1.06 | 0.11 | 0.11 | 0 |
| Solubility | 60° C. × 30 Min | Filtration Residue (% by Mass) | 0.1 | 0.1 | 16.7 | 27.1 | 12.0 |
|  |  | Degree of Dispersion (μm) | 18 | 18 | >50 | >50 | >50 |
|  | 60° C. × 60 Min | Filtration Residue (% by Mass) | — | — | 0.3 | 0.4 | 16.0 |
|  |  | Degree of Dispersion (μm) | — | — | 17 | 16 | >50 |

<Production Example 1> Dispersant for Suspension Polymerization

In a 1-L four-necked flask equipped with a stirrer, a cooling tube, and a thermometer, 900 g of ion exchange water, 60 g of sodium 2-sulfoethyl methacrylate, 10 g of potassium methacrylate, and 12 g of methyl methacrylate were placed, and the temperature was raised to 50° C. while replacing the inside of the polymerization apparatus with nitrogen. Added thereto was 0.08 g of 2,2'-azobis(2-methylpropionamidine)dihydrochloride as a polymerization initiator, followed by further temperature rise to 60° C. After raising the temperature, 18 g of methyl methacrylate was added dropwise over 75 minutes. The reaction solution was kept at 60° C. for 6 hours and then cooled to room temperature to obtain a dispersant for suspension polymerization (solid content: 10% by mass) as a transparent aqueous solution.

<Comparative Example 2> Acrylic Resin Powder (P-11)

To a 2-L four-necked flask equipped with a stirrer, a cooling tube, and a thermometer, 1020 g of ion exchange water, 0.6 g of sodium sulfate, and 0.09 g of dispersant for suspension polymerization (solid content: 10% by mass) were added and stirred to make a uniform aqueous solution. Next, 3.6 g of methacrylic acid, 416.4 g of methyl methacrylate, 180 g of n-butyl methacrylate, 3.3 g of n-dodecyl mercaptan, and 1.8 g of 2,2'-azobis(isobutyronitrile) were added to make an aqueous suspension. Next, the flask was purged with nitrogen, heated to 70° C., and reacted for about 1 hour. The temperature was raised to 95° C. and kept for 30 minutes in order to further increase the polymerization rate. Thereafter, the reaction solution was cooled to 40° C. to obtain an aqueous suspension containing the polymer. This aqueous suspension was filtered through a nylon filter cloth having an opening of 45 The filtrate was washed with ion exchange water, dehydrated, and dried at 40° C. for 16 hours to obtain an acrylic resin powder (P-11). Regarding the (P-11), the weight average molecular weight was 28,000 and the volume average particle size of primary particles was 85.8 μm.

A resin composition was obtained in exactly the same manner as in Example 1 except that the acrylic resin powder (P-11) was used. After stirring for 30 minutes, the filtration residue was 11.3% by mass, and in the grindometer, marked particle streaks were observed at a value greater than 50 μm. Despite further stirring for 30 minutes, the filtration residue was 12.4% and marked particle streaks were observed at a value greater than 50 μm in the grindometer, and the dissolution was not completed. The results are shown in Table 2.

<Comparative Example 3> Acrylic Resin Powder (P-12)

An acrylic resin powder (P-12) was produced in the same method as in Production Example 12 except that the monomer mixture and the chain transfer agent were changed in type and mass as shown in Table 2. Regarding the (P-12), the weight average molecular weight was 65,000 and the volume average particle size of primary particles was 86.3 μm.

A resin composition was obtained in exactly the same manner as in Example 1 except that the acrylic resin powder (P-12) was used. After stirring for 30 minutes, the filtration residue was 13.5% by mass, and in the grindometer, marked particle streaks were observed at a value greater than 50 μm. Despite further stirring for 30 minutes, the filtration residue was 15.6% by mass and marked particle streaks were observed at a value greater than 50 μm in the grindometer, and the dissolution was not completed. The results are shown in Table 2.

<Comparative Example 4> Acrylic Resin Powder (P-13)

In a 2-liter four-necked flask equipped with a thermometer, a nitrogen gas inlet tube, a stirring rod, a dropping funnel, and a cooling tube, 1120 g of ion exchange water was placed and nitrogen gas was passed therethrough for 30 minutes to replace the dissolved oxygen in the ion exchange water. Then, the passing of the nitrogen gas was stopped, and the temperature was raised to 65° C. while stirring at 200 rpm. Placed were 6 g of Pelex OT-P (disodium dioctyl sulfosuccinate, active ingredient 70%, manufactured by Kao Corporation), 0.4 g of n-octyl mercaptan, and 120 g of methyl methacrylate. When the inner temperature reached 65° C., 8 g of ammonium persulfate and 40 g of ion exchange water were introduced, followed by stirring for 2 hours. Next, the temperature was raised to 70° C., a mixture of 144 g of styrene, 96 g of butyl acrylate, and 2 g of n-octyl mercaptan was added dropwise over 1 hour and then kept for 2 hours. A mixture of 40 g of methyl methacrylate and 0.2 g of n-octyl mercaptan was added dropwise over 30 minutes, and the mixture was kept for 2 hours to complete the polymerization.

The obtained polymer dispersion was not collectable by spray drying. For this reason, salting-out was carried out using aluminum chloride in the polymer dispersion, followed by filtration, washing, and drying to obtain an acrylic resin powder (P-13). Regarding the (P-13), the weight average molecular weight was 73,000, the volume average particle size of primary particles was 0.10 μm, the volume average particle size of secondary particles was 134.2 μm, and the volume average particle size after ultrasonic irradiation was 128.6 μm. The results are shown in Table 3.

The acrylic resin powder (P-13) is an acrylic resin powder described in Patent document 3.

A resin composition was obtained in exactly the same manner as in Example 1 except that the acrylic resin powder (P-13) was used. After stirring for 30 minutes, the filtration residue was 1.6% by mass, and in the grindometer, marked particle streaks were observed at a value greater than 50 μm. Despite further stirring for 30 minutes, the filtration residue decreased to 0.3% by mass and particles were observed at a

TABLE 2

| | | | Comparative Example 2 P-11 | Comparative Example 3 P-12 |
|---|---|---|---|---|
| Monomer Mixture (g) | MMA | | 416.4 | 236.4 |
| | n-BMA | | 180.0 | 360.0 |
| | MAA | | 3.6 | 3.6 |
| Chain Transfer Agent (g) | n-DM | | 3.3 | |
| | OTG | | | 6.5 |
| Polymerization Initiator (g) | AIBN | | 1.8 | 1.8 |
| Weight Average Molecular Weight (in unit of ten thousand) | | | 2.8 | 6.5 |
| Volume Average Particle Size of Primary Particles (μm) | | | 85.8 | 86.3 |
| Volume Average Particle Size of Secondary Particles (μm) | | | — | — |
| Volume Average Particle Size After Ultrasonic Irradiation (μm) | | | — | — |
| Content of Vinyl-Based Monomer (ppm) | | | 3300 | 2100 |
| Amount of Aqueous Initiator (Parts by Mass) (Total of monomers is set to 100) | | | 0 | 0 |
| Amount of Chain Transfer Agent (Parts by Mass) (Total of monomers is set to 100) | | | 0.55 | 1.08 |
| Solubility | 60° C. × 30 Min | Filtration Residue (% by Mass) | 11.3 | 13.5 |
| | | Degree of Dispersion (μm) | >50 | >50 |
| | 60° C. × 60 Min | Filtration Residue (% by Mass) | 12.4 | 15.6 |
| | | Degree of Dispersion (μm) | >50 | >50 | value greater than 50 μm in the grindometer, and the dissolution was not completed. The results are shown in Table 3.

TABLE 3

|  |  |  | Comparative Example 4 P-13 |
| --- | --- | --- | --- |
| Step I (A) | Monomer Mixture (a)(g) | MMA | 120.0 |
|  | Emulsifier (g) | OT-P | 6.0 |
|  | Chain Transfer Agent (g) | n-OM | 0.4 |
|  | Polymerization Initiator (g) | KPS | — |
|  |  | APS | 8.0 |
| Step I (B) | Monomer Mixture (b-1) (g) | n-BA | 24.0 |
|  |  | St | 144.0 |
|  | Chain Transfer Agent (g) | n-OM | 2.0 |
|  | Monomer Mixture (b-2) (g) | MMA | 40.0 |
|  | Chain Transfer Agent (g) | n-OM | 0.2 |
| Weight Average Molecular Weight (in unit of ten thousand) |  |  | 7.3 |
| Volume Average Particle Size of Primary Particles (μm) |  |  | 0.10 |
| Volume Average Particle Size of Secondary Particles (μm) |  |  | 134.2 |
| Volume Average Particle Size After Ultrasonic Irradiation (μm) |  |  | 128.6 |
| Content of Vinyl-Based Monomer (ppm) |  |  | 305 |
| Amount of Aqueous Initiator (Parts by Mass) (Total of Monomers (a) and (b) is set to 100) |  |  | 2.44 |
| Amount of Chain Transfer Agent (Parts by Mass) (Total of Monomer (b) is set to 100) |  |  | 1.06 |
| Solubility | 60° C. × 30 Min | Filtration Residue (% by Mass) | 1.6 |
|  |  | Degree of Dispersion (μm) | >50 |
|  | 60° C. × 60 Min | Filtration Residue (% by Mass) | 0.7 |
|  |  | Degree of Dispersion (μm) | >50 |

The abbreviations in the table indicate the following compounds.

"MMA": methyl methacrylate (manufactured by Mitsubishi Chemical Co., Ltd.)
"n-BMA": n-butyl methacrylate (manufactured by Mitsubishi Chemical Co., Ltd.)
"MAA": methacrylic acid (manufactured by Mitsubishi Chemical Co., Ltd.)
"n-BA": n-butyl acrylate (manufactured by Mitsubishi Chemical Corporation)
"St": styrene (manufactured by NS Styrene Monomer Co., Ltd.)
"n-OM": n-octyl mercaptan (manufactured by Wako Pure Chemical Industries, Ltd.)
"n-DM": n-dodecyl mercaptan (manufactured by Wako Pure Chemical Industries, Ltd.)
"OTG": octyl thioglycolate (manufactured by Yodo Kagaku Co., Ltd.)
"KPS": potassium persulfate (manufactured by Mitsubishi Gas Chemical Company, Inc.)
"APS": ammonium persulfate (manufactured by Sigma-Aldrich)
"AIBN": 2,2'-azobis(isobutyronitrile) (manufactured by Wako Pure Chemical Industries, Ltd.)
"OT-P": Pelex OT-P, disodium dioctyl sulfosuccinate, active ingredient 70% (manufactured by Kao Corporation)
"G-15": Neopelex G-15, sodium dodecylbenzenesulfonate, active ingredient 15% (manufactured by Kao Corporation)

Example 10

[Dissolution Step]
In a 300-milliliter four-necked flask equipped with a thermometer, a stirring rod, and a cooling tube, 75.6 g of polypropylene glycol having a weight average molecular weight of about 2000 (trade name Adeka Polyether P-2000, manufactured by ADEKA corporation) and 5.5 g of polypropylene glycol having a weight average molecular weight of about 400 (trade name Adeka Polyether P-400, manufactured by ADEKA corporation) as polyols, 0.6 g of "Modaflow 2100" (Allnex) as a defoaming agent, and 43.6 g of the acrylic resin powder (P-1), followed by stirring while raising the temperature to 100° C. in 30 minutes to obtain a resin composition in a uniform solution state.

[Reduced Pressure Dehydration Step]
This resin composition was heated and stirred at 15 kPa at 100° C. for 1 hour, and dehydrated under reduced pressure.

[Urethane Prepolymer Formation Step]
Added were 45.0 g of a polyester polyol "HS 2H-351A" (manufactured by Hokoku Corporation, a polyester polyol of hexane diol and adipic acid, molecular weight 3500, melting point 55° C., OHV=32 mg KOH/g) as a polyol, 29.6 g of 4,4'-diphenylmethane diisocyanate as an isocyanate, and 0.09 g of 2,2'-dimorpholino diethyl ether (manufactured by Mitsui Fine Chemicals, Inc.) as a curing catalyst, followed by stirring at 15 kPa at 100° C. for 1 hour. The mixture was then cooled to obtain a hot melt adhesive, which was stored tightly under nitrogen.

The content of the vinyl-based monomer in the obtained hot melt adhesive was 135 ppm. The results of initial adhesive strength and open time are shown in Table 4-1.

Examples 11 to 15

Hot melt adhesives were obtained in exactly the same manner as in Example 10 except that the acrylic resin powder was changed in type and amount as shown in Table 4-1. The results of initial adhesive strength and open time are shown in Table 4-1.

Comparative Example 5

The dissolution step was carried out in exactly the same manner as in Example 10 except that 21.8 g of the acrylic resin powder (P-10) was used. The obtained resin composition was uniform but was in a gel state without fluidity, which made it impossible to carry out the reduced pressure dehydration step and the subsequent urethane prepolymer formation step. Therefore, no hot melt adhesive was obtained.

Comparative Example 6

The dissolution step was carried out in exactly the same manner as in Example 10 except that the acrylic resin powder (P-11) was used. Particulate resin powder remained and the dissolution was not completed, so that a uniform resin composition could not be obtained.

Comparative Example 7

A hot melt adhesive was obtained in exactly the same manner as in Example 10 except that, after the temperature reached 100° C. in [Dissolution Step], the acrylic resin powder (P-11) was used for dissolution and stirring was carried out at 100° C. until a uniform resin composition was obtained.

The results of initial adhesive strength and open time are shown in Table 4. Although the initial adhesive strength was favorable, it took another hour after reaching 100° C. until the (P-11) was dissolved. In addition, the content of the vinyl-based monomer in the obtained hot melt adhesive was 450 ppm.

Comparative Example 8

The dissolution step was carried out in exactly the same manner as in Example 10 except that the acrylic resin powder (P-12) was used. Particulate resin powder remained and the dissolution was not completed, so that a uniform resin composition could not be obtained.

Comparative Example 9

A hot melt adhesive was obtained in exactly the same manner as in Example 10 except that the acrylic resin powder (P-13) was used.

The above results are shown in Table 4-2.

TABLE 4-1

| | | Example 10 | Example 11 | Example 12 | Example 13 | Example 14 | Example 15 | Example 16 | Example 17 |
|---|---|---|---|---|---|---|---|---|---|
| Acrylic Resin Powder | Type | P-1 | P-2 | P-6 | P-7 | P-1 | P-1 | P-8 | P-9 |
| | Amount (g) | 43.6 | 43.6 | 43.6 | 43.6 | 21.8 | 21.8 | 21.8 | 21.8 |
| | Type | | | | | P-8 | P-9 | | |
| | Amount (g) | | | | | 21.8 | 21.8 | | |
| P-2000 (g) | | 75.6 | 75.6 | 75.6 | 75.6 | 75.6 | 75.6 | 75.6 | 75.6 |
| P-400 (g) | | 5.5 | 5.5 | 5.5 | 5.5 | 5.5 | 5.5 | 5.5 | 5.5 |
| Modaflow 2100 (g) | | 0.6 | 0.6 | 0.6 | 0.6 | 0.6 | 0.6 | 0.6 | 0.6 |
| HS 2H-351A (g) | | 45.01 | 45.01 | 45.01 | 45.01 | 45.01 | 45.01 | 45.01 | 45.01 |
| DMDEE (g) | | 0.09 | 0.09 | 0.09 | 0.09 | 0.09 | 0.09 | 0.09 | 0.09 |
| MDI (g) | | 29.6 | 29.6 | 29.6 | 29.6 | 29.6 | 29.6 | 29.6 | 29.6 |
| Initial Adhesion | Adhesive Strength (MPa) | 0.28 | 0.11 | 0.24 | 0.27 | 0.29 | 0.17 | 0.16 | 0.10 |
| | Evaluation | AA | B | AA | AA | AA | A | A | B |
| | Failure Pattern | CF | CF | CF | CF | CF | CF | CF | CF |
| Open Time Adhesive Strength (MPa)/ Failure Pattern | 1 min | 0.31/CF | 0.15/CF | 0.20/CF | 0.27/CF | 0.26/CF | 0.16/CF | 0.16/CF | 0.11/CF |
| | 2 min | 0.29/CF | 0.10/CF | 0.21/CF | 0.32/CF | 0.28/CF | 0.16/CF | 0.17/CF | 0.12/CF |
| | 5 min | 0.23/CF | 0.10/CF | 0.17/CF | 0.24/CF | 0.23/CF | 0.20/CF | 0.14/CF | 0.12/CF |
| | 10 min | 0.09/SCF | 0.10/CF | 0.10/AF | 0.07/AF | 0.08/SCF | 0.08/SCF | 0.05/SCF | 0.03/SCF |
| Open Time Limit (Min) | | 10 | >10 | 10 | 10 | 10 | 10 | 10 | 10 |

TABLE 4-2

| | | Comparative Example 5 | Comparative Example 6 | Comparative Example 7 | Comparative Example 8 | Comparative Example 9 |
|---|---|---|---|---|---|---|
| Acrylic Resin Powder | Type | P-10 | P-11 | P-11 | P-12 | P-13 |
| | Amount (g) | 21.8 | 43.6 | 43.6 | 43.6 | 43.6 |
| | Type | | | | | |
| | Amount (g) | | | | | |
| P-2000 (g) | | 75.6 | 75.6 | 75.6 | 75.6 | 75.6 |
| P-400 (g) | | 5.5 | 5.5 | 5.5 | 5.5 | 5.5 |
| Modaflow 2100 (g) | | 0.6 | 0.6 | 0.6 | 0.6 | 0.6 |
| HS 2H-351A (g) | | — | — | 45.01 | — | 45.01 |
| DMDEE (g) | | — | — | 0.09 | — | 0.09 |
| MDI (g) | | — | — | 29.6 | — | 29.6 |
| Initial Adhesion | Adhesive Strength (MPa) | — | — | 0.28 | — | 0.07 |
| | Evaluation | — | — | AA | — | C |
| | Failure Pattern | — | — | CF | — | CF |
| Open Time Adhesive Strength (MPa)/ Failure Pattern | 1 min | — | — | 0.30/CF | — | 0.07/SCF |
| | 2 min | — | — | 0.30/CF | — | 0.03/SCF |
| | 5 min | — | — | 0.22/CF | — | 0.02/SCF |
| | 10 min | — | — | 0.11/SCF | — | 0.03/SCF |
| Open Time Limit (Min) | | — | — | 10 | — | <1 |

The abbreviations in the tables indicate the following compounds.
- "P-2000": Adeka Polyether P-2000 (manufactured by ADEKA corporation)
- "P-400": Adeka Polyether P-400 (manufactured by ADEKA corporation)
- "DMDEE": dimorpholino diethyl ether (manufactured by Mitsui Fine Chemicals, Inc.)
- "MDI": 4,4'-diphenylmethane diisocyanate, trade name Millionate MT-F (manufactured by Tosoh Corporation)

What is claimed is:

1. An acrylic resin powder comprising:
a copolymer which contains a methyl methacrylate unit, wherein
a volume average particle size of a primary particle is 0.1 to 10 µm, a volume average particle size of a secondary particle is 20 to 80 µm, a weight average molecular weight is 10,000 to 500,000, and the acrylic resin powder is soluble in polypropylene glycol having a weight average molecular weight of 1000 under stirring at a concentration of 10% by mass at 60° C. for 60 minutes.

2. The acrylic resin powder according to claim 1, wherein the volume average particle size after ultrasonic irradiation for 5 minutes in an aqueous medium is 0.2 to 20 µm.

3. The acrylic resin powder according to claim 1, wherein a content of a vinyl-based monomer is 1000 ppm or less.

4. A resin composition, comprising an acrylic resin powder according to claim 1 and a polyalkylene glycol.

5. The resin composition according to claim 4, wherein a weight average molecular weight of the polyalkylene glycol is 200 to 5000.

6. The resin composition according to claim 4, further comprising a polyester polyol.

7. The resin composition according to 4, further comprising an isocyanate.

8. A hot melt adhesive, comprising a resin composition according to claim 4.

9. The hot melt adhesive according to claim 8, wherein a content of a vinyl-based monomer is 250 ppm or less.

10. A hot melt adhesive comprising a mixture of:
(A) a urethane prepolymer; and
(B) an acrylic resin powder comprising a copolymer which contains a methyl methacrylate unit, wherein:
in said resin powder, a volume average particle size of a primary particle is 0.1 to 10 µm, a volume average particle size of a secondary particle is 20 to 80 µm, a weight average molecular weight is 10,000 to 500,000, and the acrylic resin powder is soluble in polypropylene glycol having a weight average molecular weight of 1000 under stirring at a concentration of 10% by mass at 60° C. for 60 minutes; and
a content of a vinyl-based monomer is 250 ppm or less.

11. A method of producing an acrylic resin powder according to claim 1, comprising:
I(A) obtaining a polymer dispersion (A) by polymerizing, in a medium containing water as a main component and by use of a water-soluble radical polymerization initiator, a monomer mixture (a) a polymer of which does not dissolve in the medium and which has a solubility of 0.02% by mass or more relative to the medium at 20° C. in the presence of an emulsifier having a critical micelle concentration or less, and
I(B) obtaining a polymer dispersion (B) by adding a monomer mixture (b) containing methyl methacrylate and 0.1 to 3 parts by mass of a chain transfer agent relative to 100 parts by mass of (b) dropwise to the polymer dispersion (A), followed by polymerization,
where the water-soluble radical polymerization initiator of [Step I] is 0.1 parts by mass or more when a total amount of the monomer mixtures (a) and (b) is 100 parts by mass; and
II obtaining a resin powder by spray drying the polymer dispersion (B).

12. The method according to claim 11, wherein the acrylic resin powder is soluble in polypropylene glycol having a weight average molecular weight of 1000 under stirring at a concentration of 10% by mass at 60° C. for 60 minutes.

13. The method according to claim 11, wherein the water-soluble radical polymerization initiator is a persulfate.

14. A method of producing a resin composition, comprising dissolving an acrylic resin powder obtained by the production method according to claim 11 in a polyalkylene glycol.

15. A method of producing a hot melt adhesive, comprising:
obtaining a resin composition by dissolving an acrylic resin powder obtained by the production method according to claim 11 in a polyalkylene glycol; and
obtaining a urethane prepolymer by further mixing an isocyanate.

* * * * *